United States Patent
Suzuki et al.

(10) Patent No.: US 10,661,868 B2
(45) Date of Patent: May 26, 2020

(54) VESSEL PROPULSION APPARATUS AND VESSEL INCLUDING THE SAME

(71) Applicant: YAMAHA HATSUDOKI KABUSHIKI KAISHA, Iwata-shi, Shizuoka (JP)

(72) Inventors: Takayoshi Suzuki, Shizuoka (JP); Kohei Yamaguchi, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 53 days.

(21) Appl. No.: 15/810,231

(22) Filed: Nov. 13, 2017

(65) Prior Publication Data

US 2018/0134353 A1     May 17, 2018

(30) Foreign Application Priority Data

Nov. 14, 2016    (JP) ................................ 2016-221860

(51) Int. Cl.
*B63H 1/16* (2006.01)
*B63H 20/00* (2006.01)
(Continued)

(52) U.S. Cl.
CPC ............... *B63H 1/16* (2013.01); *B63H 5/125* (2013.01); *B63H 5/14* (2013.01); *B63H 20/007* (2013.01);
(Continued)

(58) Field of Classification Search
CPC .... B63H 1/16; B63H 2001/165; B63H 5/125; B63H 5/14; B63H 20/007;
(Continued)

(56) References Cited

U.S. PATENT DOCUMENTS

| 3,914,629 A | * | 10/1975 | Gardiner | ................ | H02K 5/132 |
| | | | | | 310/156.12 |
| 5,031,561 A | | 7/1991 | Nilsson | | |

(Continued)

FOREIGN PATENT DOCUMENTS

| DE | 10 2010 001 707 A1 | 8/2011 |
| EP | 2 591 993 A1 | 5/2013 |
| EP | 3 048 038 A1 | 7/2016 |
| EP | 3 051 376 A1 | 8/2016 |

*Primary Examiner* — Ajay Vasudeva
(74) *Attorney, Agent, or Firm* — Keating and Bennett, LLP

(57) ABSTRACT

A vessel propulsion apparatus includes a propulsive force generator including a duct and a propeller. The duct includes a stator. The propeller includes a rim that includes a rotor disposed at a position facing the stator, and a blade on an inner side in a radial direction of the rim. The vessel propulsion apparatus further includes a steering shaft that turnably supports the duct, a motor controller that rotationally drives an electric motor including the stator and the propeller in forward and reverse rotation directions, a turning mechanism that turns the duct in a full turning angle range including a range of ±180 degrees, and a turning angle range limiter that limits a turning angle range of the turning mechanism to a reduced turning angle range narrower than the full turning angle range, and when a predetermined limitation cancellation condition is met, cancels the limitation and allows turning in a turning angle range wider than the reduced turning angle range.

12 Claims, 10 Drawing Sheets

(51) Int. Cl.
*B63H 23/24* (2006.01)
*B63H 5/125* (2006.01)
*B63H 25/42* (2006.01)
*B63H 21/21* (2006.01)
*B63H 5/14* (2006.01)
*H02K 1/27* (2006.01)

(52) U.S. Cl.
CPC ............ *B63H 21/21* (2013.01); *B63H 23/24* (2013.01); *B63H 25/42* (2013.01); *B63H 2001/165* (2013.01); *B63H 2005/1258* (2013.01); *H02K 1/27* (2013.01); *Y02T 70/5272* (2013.01)

(58) Field of Classification Search
CPC ............ B63H 2005/1258; B63H 21/21; B63H 23/24; B63H 25/42; H02K 1/27; Y02T 70/5272
See application file for complete search history.

(56) References Cited

U.S. PATENT DOCUMENTS

| | | | | |
|---|---|---|---|---|
| 5,522,335 | A * | 6/1996 | Veronesi | B63H 5/125 114/151 |
| 8,150,569 | B2 * | 4/2012 | Kaji | G05D 1/0206 114/144 E |
| 8,521,347 | B2 * | 8/2013 | Ito | B63H 25/48 440/1 |
| 8,956,195 | B2 * | 2/2015 | Suzuki | B63H 1/16 440/2 |
| 10,093,405 | B2 * | 10/2018 | Ostrow | B63H 25/42 |
| 10,167,067 | B2 * | 1/2019 | Suzuki | B63H 23/326 |
| 2013/0072076 | A1 | 3/2013 | Pellegrinetti et al. | |
| 2014/0364018 | A1 | 12/2014 | Hara et al. | |
| 2015/0158568 | A1 | 6/2015 | Van Der Laan et al. | |

* cited by examiner

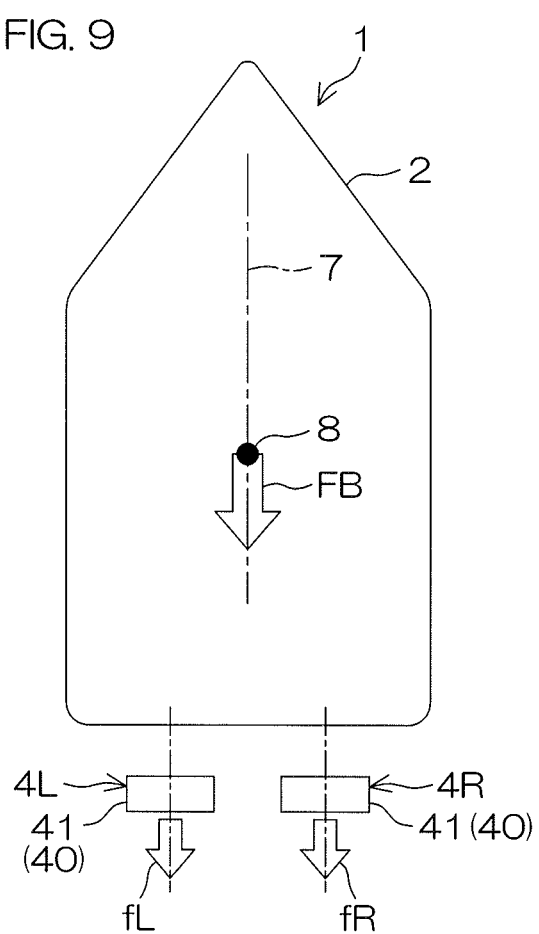

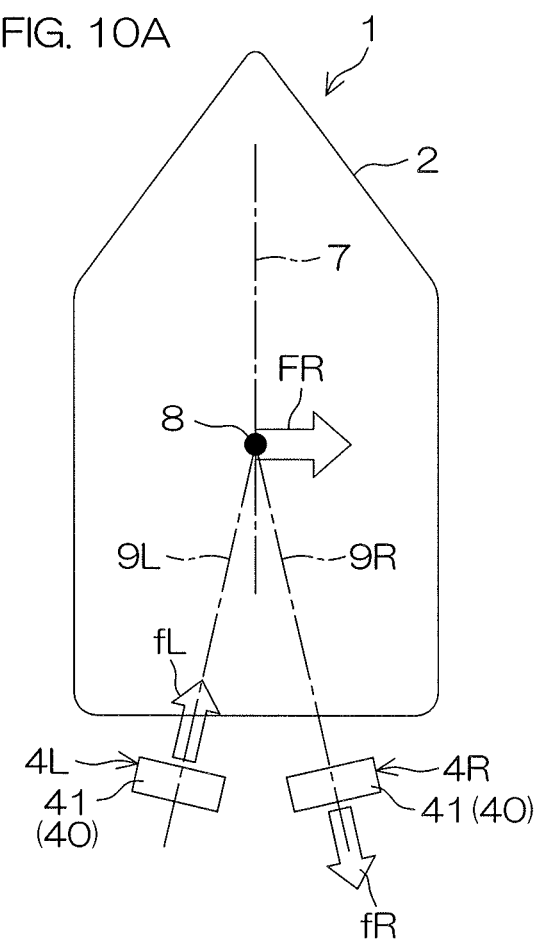

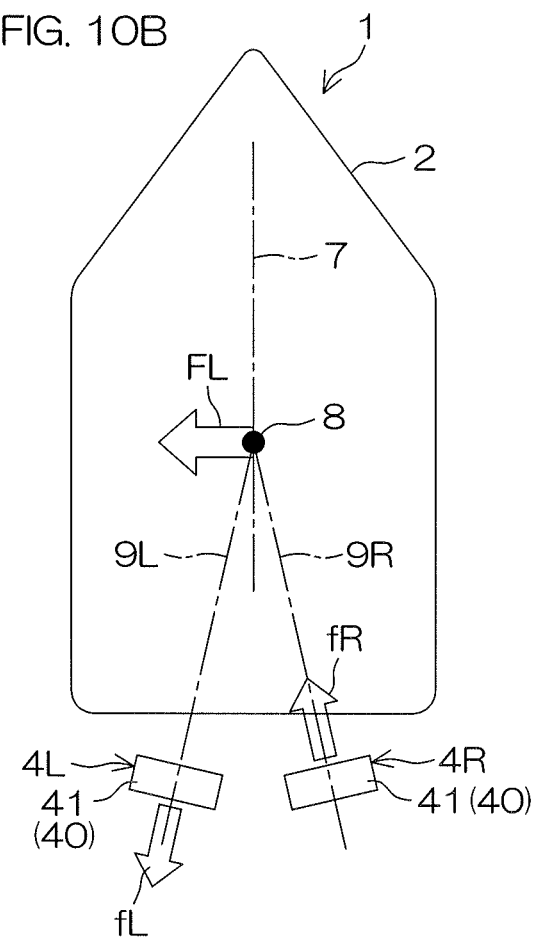

VESSEL PROPULSION APPARATUS AND VESSEL INCLUDING THE SAME

CROSS REFERENCE TO RELATED APPLICATIONS

This application claims the benefit of priority to Japanese Patent Application No. 2016-221860 filed on Nov. 14, 2016. The entire contents of this application are hereby incorporated herein by reference.

BACKGROUND OF THE INVENTION

1. Field of the Invention

The present invention relates to a vessel propulsion apparatus including an electric propulsion unit, and a vessel including the same.

2. Description of the Related Arts

United States Patent Application Publication No. 2014/0364018 A1 discloses a vessel including a pair of right and left outdrive apparatuses. In order to move a vessel laterally to the portside or starboard direction, turning angles of the pair of outdrive apparatuses are controlled so that a resultant force of their propulsive forces is applied to the center of gravity of the vessel. Then, one outdrive apparatus is rotated forward, and the other outdrive apparatus is reversely rotated. A propulsive force generated by an outdrive apparatus differs between forward rotation and reverse rotation even when its rotation speed is the same. Therefore, a reference propulsive force ratio as a ratio of a rotation speed of the outdrive apparatus to be rotated forward and a rotation speed of the outdrive apparatus to be reversely rotated is obtained. When moving a vessel laterally, based on the reference propulsive force ratio, the pair of outdrive apparatuses are controlled.

SUMMARY OF THE INVENTION

The inventors of preferred embodiments of the present invention described and claimed in the present application conducted an extensive study and research regarding a vessel propulsion apparatus, such as the one described above, and in doing so, discovered and first recognized new unique challenges and previously unrecognized possibilities for improvements as described in greater detail below.

The inventors of the preferred embodiments of the present invention exhaustively considered an arrangement of a vessel propulsion apparatus including an electric propulsion unit. When using an electric propulsion unit, a forward-traveling propulsive force to rotate the propeller forward and make the vessel travel forward is generated, and a backward-traveling propulsive force to reversely rotate the propeller and make the vessel travel backward is generated. Also, by providing a pair of electric propulsion units on the starboard side and the portside of the hull, the vessel is able to be moved laterally. For the electric propulsion unit, it is preferable to use a design that maximizes the forward-traveling propulsive force to increase energy efficiency. However, accordingly, a difference is caused between the propulsive forces when the propeller is rotated forward and when the propeller is reversely rotated at the same rotation speed, that is, between the forward-traveling propulsive force and the backward-traveling propulsive force. The forward-traveling propulsive force is greater than the backward-traveling propulsive force.

Therefore, when moving the vessel laterally, the rotation speed of the propeller being rotated forward should not be increased to the maximum value, and a rotation speed that generates a forward-traveling propulsive force equivalent to the maximum backward-traveling propulsive force at the time of reverse-rotation driving is an upper limit. Therefore, at the time of lateral movement, a propulsive force generated by the propulsion unit is not the maximum.

The same problem occurs when braking the vessel. That is, when braking the vessel traveling forward, the propeller is driven to reversely rotate, and accordingly, a backward-traveling propulsive force is generated by the propulsion unit. However, the backward-traveling propulsive force is smaller than the forward-traveling propulsive force, so that braking using a maximum propulsive force that the propulsion unit is able to generate cannot be performed.

Preferred embodiments of the present invention provide vessel propulsion apparatuses that solve the above-described problem, and vessels including the same.

In order to overcome the previously unrecognized and unsolved challenges described above, a preferred embodiment of the present invention provides a vessel propulsion apparatus including an electric propulsive force generator. The propulsive force generator includes a duct and a propeller. The duct includes a stator. The propeller includes a rim that includes a rotor disposed at a position facing the stator, and a blade on the inner side in a radial direction of the rim. The vessel propulsion apparatus further includes a steering shaft that turnably supports the duct, a motor controller that rotationally drives an electric motor including the stator and the propeller in a forward rotation direction to cause the propeller to generate a forward-traveling propulsive force and in a reverse rotation direction to cause the propeller to generate a backward-traveling propulsive force, a turning mechanism that turns the duct in a full turning angle range including a range of about ±180 degrees, and a turning angle range limiter that limits a turning angle range of the turning mechanism to a reduced turning angle range narrower than the full turning angle range, and, when a predetermined limitation cancellation condition is met, cancels the limitation and allows turning in a turning angle range (for example, the full turning angle range) wider than the reduced turning angle range.

"Forward-traveling propulsive force" is a propulsive force to propel a vessel forward. However, when this term is used in relation to a direction of a propulsive force generated by the propulsive force generator or the propeller, a direction of the propulsive force generated in a state where the front edge of the duct is directed toward the front side of the vessel may be a direction in which the propulsive force propels the vessel forward. That is, when the propulsive force generator or the propeller generates a forward-traveling propulsive force in a state where the front edge of the duct is directed toward the rear side, this forward-traveling propulsive force is applied as a backward-traveling propulsive force to the vessel. Similarly, "backward-traveling propulsive force" is a propulsive force to propel the vessel backward. However, when this term is used in relation to a direction of a propulsive force generated by the propulsive force generator or the propeller, a direction of the propulsive force generated in a state where the front edge of the duct is directed toward the front side of the vessel may be a direction in which the propulsive force propels the vessel backward. That is, when the propulsive force generator or the propeller generates a backward-traveling propulsive force in a state where the front edge of the duct is directed toward the rear side, this backward-traveling propulsive force is applied as a forward-traveling propulsive force to the vessel.

With the arrangement described above, the propulsive force generator generates a forward-traveling propulsive force when the electric motor is driven in a forward rotation direction, and generates a backward-traveling propulsive force when the electric motor is driven in a reverse rotation direction. By turning the duct with the turning mechanism, the direction of the propulsive force is changed, and accordingly, the traveling direction of the vessel is changed. The turning mechanism turns the duct in the full turning angle range including a range of about ±180 degrees. The turning angle may be determined so that a propulsive force is generated along the center line of the hull when the turning angle is 0 degrees. Under normal conditions, the turning angle range of the turning mechanism is limited to the reduced turning angle range narrower than the full turning angle range. Accordingly, while difficulties such as those for wiring are eliminated, turning responsiveness is secured. On the other hand, when a predetermined limitation cancellation condition is met, turning in a turning angle range (for example, a full turning angle range) wider than the reduced turning angle range is allowed. Therefore, the propulsive force generator is turned more freely. For example, it is possible to turn such that the duct is directed directly behind the hull. Accordingly, an operation concentrating a propulsive force in a backward-traveling direction is enabled, and a propulsive force generated by the propulsive force generator is used to the maximum. Therefore, the traveling performance of the vessel is improved.

In a preferred embodiment of the present invention, the propulsive force generator is designed so that a forward-traveling propulsive force generated when the electric motor is rotated forward is greater than a backward-traveling propulsive force generated when the electric motor is reversely rotated at the same speed. Therefore, a greater backward-traveling propulsive force is provided to the hull by forward rotation of the electric motor in a state where the duct is directed toward the rear side of the hull than by reverse rotation of the electric motor in a state where the duct is directed toward the front side of the hull. Accordingly, by using a propulsive force generated by the propulsive force generator to the maximum, a backward-traveling propulsive force is provided to the hull.

In a preferred embodiment of the present invention, the vessel propulsion apparatus further includes a target turning angle setter that sets a target turning angle in the reduced turning angle range, and a rotation direction controller that sets a rotation direction of the electric motor in the motor controller. When the limitation cancellation condition is met, the target turning angle setter reverses the target turning angle by 180 degrees, and the rotation direction controller instructs the motor controller to reverse the rotation direction of the electric motor.

With this arrangement, when the limitation cancellation condition is met, the direction of the duct reverses by 180 degrees, and the rotation direction of the electric motor reverses. Therefore, when the limitation cancellation condition is met while the electric motor rotates in the reverse rotation direction in a state where the duct is directed toward the front side of the vessel, the duct is directed toward the rear side, and the electric motor is driven in the forward rotation direction. Accordingly, by using the maximum propulsive force generated by the propulsive force generator, a backward-traveling propulsive force is provided to the hull.

In a preferred embodiment of the present invention, the limitation cancellation condition includes an input of a braking command to brake the vessel. With this arrangement, when a braking command is input, a limitation on the turning angle range is cancelled. Therefore, by using the maximum propulsive force generated by the propulsive force generator, the hull is braked. Accordingly, the braking distance becomes shorter, so that the traveling performance of the vessel is improved.

In a preferred embodiment of the present invention, the vessel propulsion apparatus further includes a braking controller that controls the turning mechanism to direct the propulsive force generator toward the rear side of the vessel by turning the duct beyond the reduced turning angle range, and controls the motor controller to drive the electric motor in the forward rotation direction when the braking command is input. With this arrangement, the hull is braked by using a maximum propulsive force generated by the propulsive force generator, so that the braking distance is shorter.

In a preferred embodiment of the present invention, the limitation cancellation condition includes an input of a lateral movement command to move the vessel while preventing the vessel from turning. With this arrangement, when a lateral movement command is input, a limitation on the turning angle range is cancelled. Therefore, the hull is moved laterally by utilizing a maximum propulsive force generated by the propulsive force generator. Accordingly, a propulsive force in the lateral movement direction increases, so that the traveling performance of the vessel is improved.

In a preferred embodiment of the present invention, the vessel propulsion apparatus includes a couple of the propulsive force generators, a couple of the steering shafts respectively corresponding to the couple of propulsive force generators, a couple of the turning mechanisms respectively corresponding to the couple of propulsive force generators, and a lateral movement controller that controls the motor controller and the couple of turning mechanisms in response to the lateral movement command so as to cause the couple of propulsive force generators to generate a propulsive force to move the vessel laterally. Then, the lateral movement controller controls, in response to an input of the lateral movement command, the couple of turning mechanisms so that propulsive force action lines including directions of the propulsive forces of the couple of propulsive force generators respectively pass through the center of gravity of the vessel in a planar view, and that one of the couple of propulsive force generators is turned beyond the reduced turning angle range and directed toward the rear side of the vessel, and controls the motor controller to rotationally drive the electric motor of the propulsive force generator directed toward the rear side of the vessel in the forward rotation direction.

With this arrangement, since both of the propulsive force action lines (action lines of the propulsive forces) of the couple of propulsive force generators pass through the center of gravity of the vessel, the propulsive forces generated by these propulsive force generators do not apply a moment to the vessel. Therefore, the vessel is prevented from turning. In this state, by providing a forward-traveling propulsive force to the vessel using one propulsive force generator and providing a backward-traveling propulsive force to the vessel using the other propulsive force generator, the vessel moves laterally. In this case, the duct of the propulsive force generator that would provide a backward-traveling propulsive force to the vessel is directed toward the rear side, and the electric motor of this propulsive force generator is driven in the forward rotation direction. Accordingly, the propulsive force generator generates a forward-traveling propulsive force while being directed toward the rear side, and this forward-traveling propulsive force is applied as a backward-traveling propulsive force to the vessel. Accordingly, a large backward-traveling propulsive force is provided to the hull. Thus, by using maximum propulsive forces generated by the propulsive force generators, the vessel is moved laterally.

A preferred embodiment of the present invention provides a vessel including a hull and a vessel propulsion apparatus equipped in the hull and including the features described above. Accordingly, the vessel is able to travel using a maximum propulsive force generated by the propulsive force generator, so that the traveling performance of the vessel is improved.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 9 shows an example of a situation in which a reverse propulsion mode is set for both a right and a left electric propulsion unit and a vessel is braked.

FIG. 10A shows a case in which a hull is moved laterally without turning, in particular, in a case in which the hull is moved laterally rightward.

FIG. 10B shows a case in which a hull is moved laterally without turning, in particular, in a case in which the hull is moved laterally leftward.

DETAILED DESCRIPTION OF THE PREFERRED EMBODIMENTS

Figure 1:
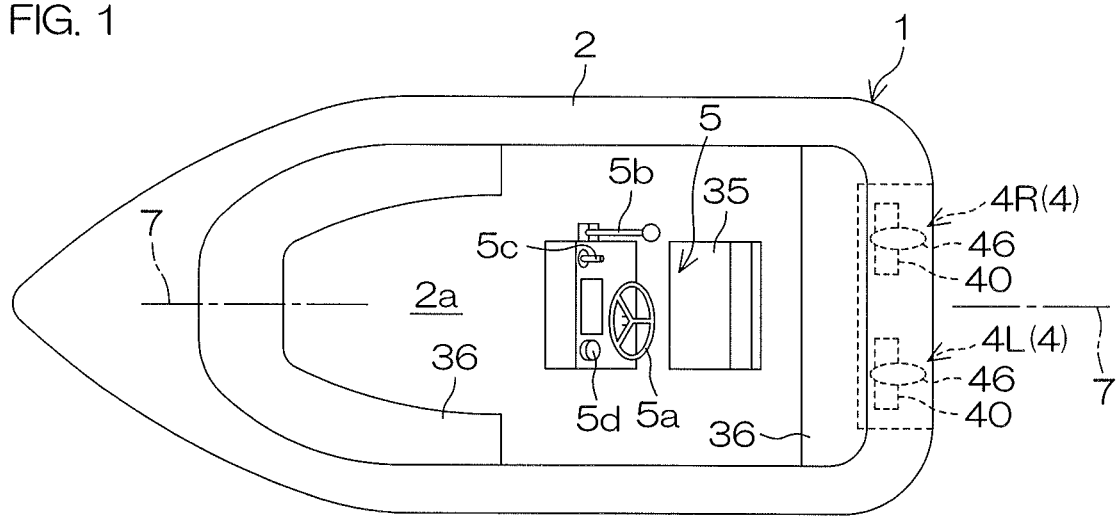
FIG. 1 is a schematic plan view of an example of a vessel according to a preferred embodiment of the present invention.
Figure 2:
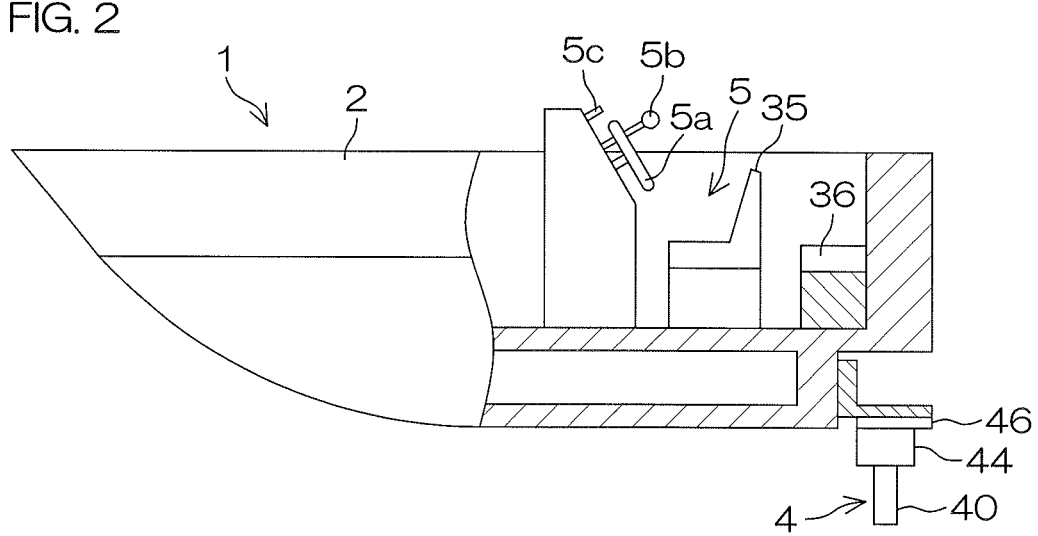
FIG. 2 is a side view partially showing a section of the vessel.

FIG. 1 is a schematic plan view of a vessel 1 according to a preferred embodiment of the present invention, and FIG. 2 is a side view of the same, partially showing a section thereof. The vessel 1 includes a hull 2, a pair of right and left electric propulsion units 4R and 4L (collectively referred to as an "electric propulsion unit 4") equipped in the hull 2. The electric propulsion unit 4R on the starboard side is located to the right of the center line 7 of the hull 2, and the electric propulsion unit 4L on the portside is located to the left of the center line of the hull 2.

A cockpit 5 is disposed inside a cabin 2a inside the hull 2. A steering wheel 5a, a shift lever 5b, and a joystick 5c, etc., are disposed in the cockpit 5. A vessel operator seat 35 is disposed in the cockpit 5. A seat 36 for occupants is disposed inside the cabin 2a.

Figure 3:
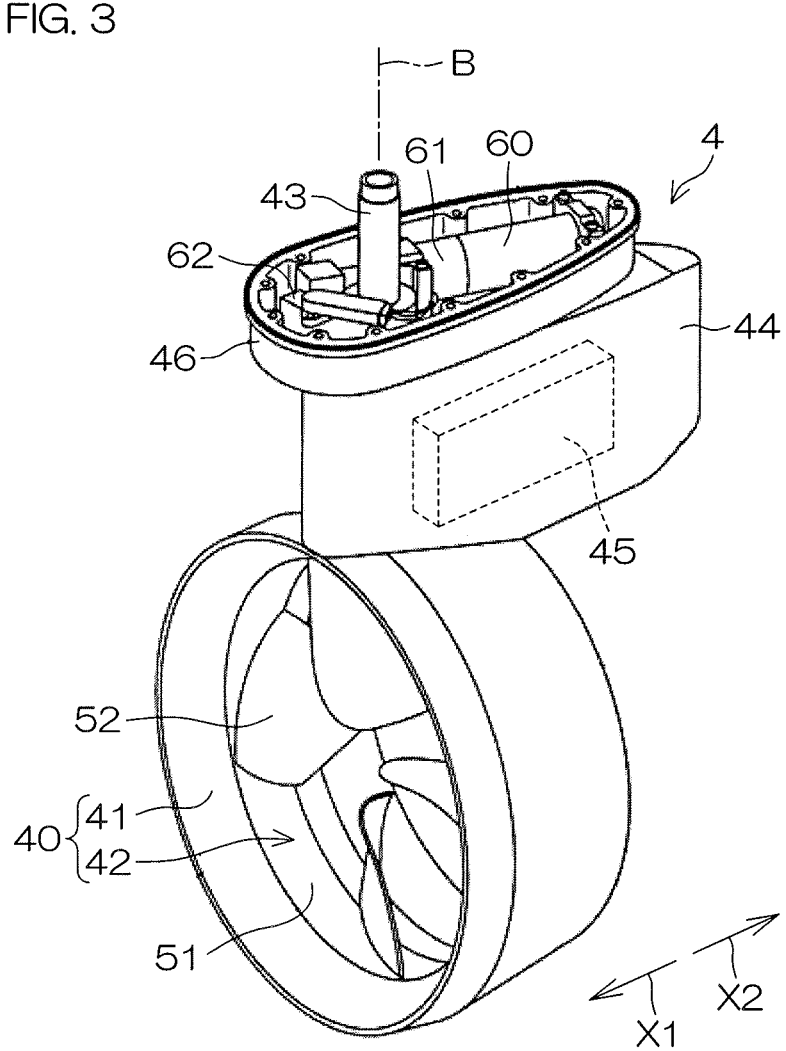
FIG. 3 is a perspective view of an example of an electric propulsion unit.
Figure 4:
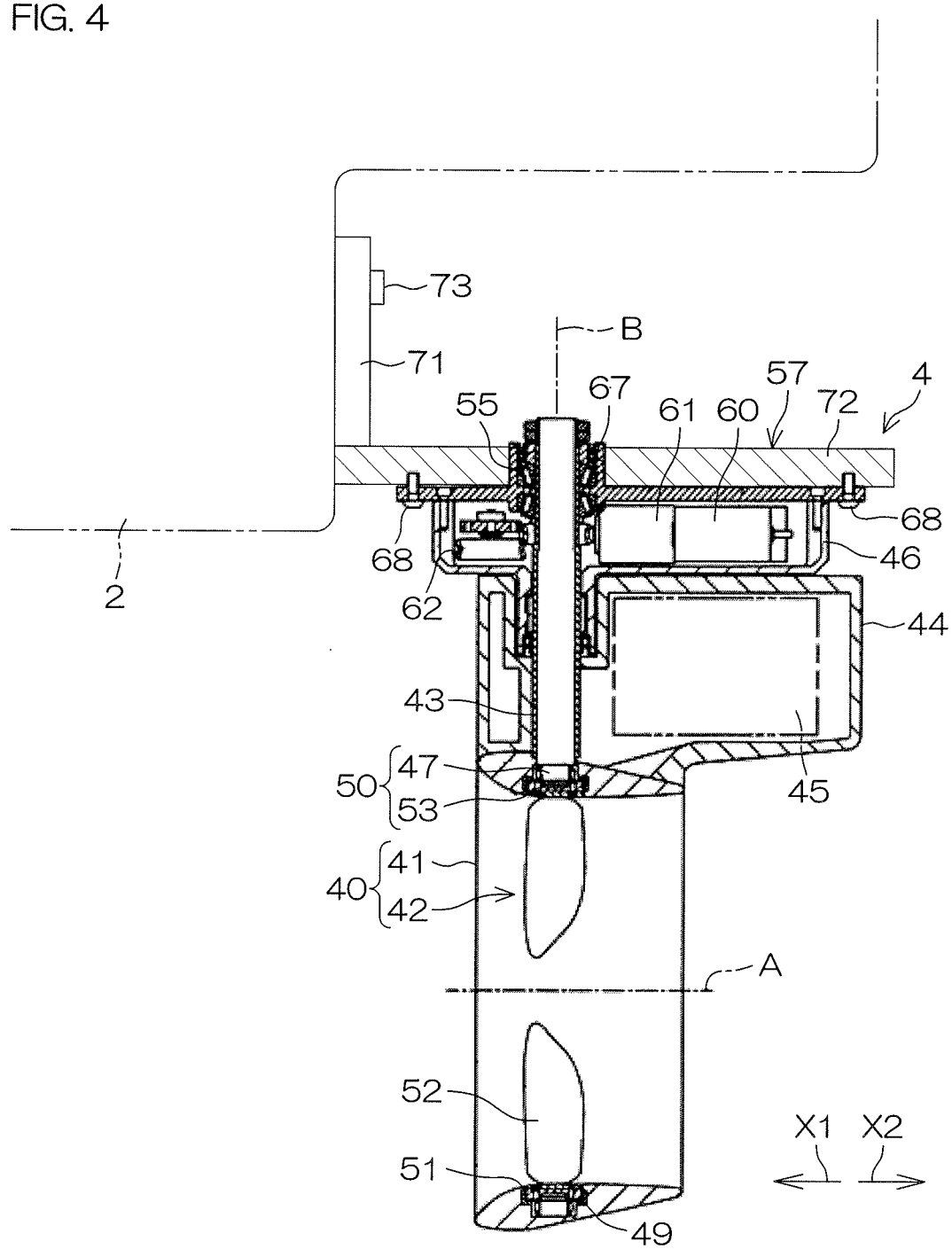
FIG. 4 is a longitudinal sectional view of the electric propulsion unit.

FIG. 3 is a perspective view of an example of the electric propulsion unit, and FIG. 4 is a longitudinal sectional view of the same. The electric propulsion unit 4 includes a cylindrical duct 41, a propeller 42, a steering shaft 43, a casing 44, a motor controller 45, and a turning mechanism 46. The duct 41 includes a stator 47. The duct 41 and the propeller 42 define a propulsive force generator 40. The propulsive force generator 40 is turned around a steering shaft 43 by the turning mechanism 46. The propeller 42 includes a rim 51 and blades 52. The rim 51 includes a rotor 53. The stator 47 and the rotor 53 face each other, and these elements define an electric motor 50 (switched reluctance motor). That is, by applying a current to the stator 47, the rotor 53 rotates around a rotation axis A. As the electric motor 50, other than a switched reluctance motor (SR motor), a permanent magnet motor or a stepping motor may be used.

The duct 41 is a rotary body in which the rotation axis A is an axis of rotation, and its cross section in a plane including the rotation axis A is wing-shaped. That is, the cross section has a shape that is round at a front edge and pointed at a rear edge. An inner diameter (radius of an inner circumferential surface) of the duct 41 decreases toward the rear side in a region in front of the blades 52, and is almost uniform in a region from the blades 52 to the rear edge. An outer diameter (radius of an outer circumferential surface) of the duct 41 is almost uniform in the region in front of the blades 52, and decreases toward the rear side in the region from the blades 52 to the rear edge.

On the inner circumferential surface of the duct 41, a circumferential recess recessed radially outward is provided. The rim 51 is housed in this recess. More specifically, the rim 51 is supported rotatably by the duct 41 via a fluid bearing 49 provided along the recess of the duct 41.

On the outer circumference of the recess of the duct 41, the stator 47 is disposed. The stator 47 includes coils. The stator 47 generates a magnetic field when electric power is supplied to the coils. A plurality of coils are disposed circumferentially along the recess of the duct 41. Electric power is respectively supplied to the plurality of coils in synchronization with rotation. Accordingly, a magnetic force of the stator 47 is applied to the rotor 53 of the propeller 42, and accordingly, the propeller 42 is rotated.

The blades 52 of the propeller 42 are located on the inner side of the ring-shaped rim 51, and radially outer edges of the blades are fixed to an inner circumferential surface of the rim 51. That is, the blades 52 project inward in the radial direction of the rim 51 from the inner circumferential surface of the rim 51. For example, four blades 52 are provided at even intervals (of about 90 degrees) along the circumferential direction. The blades 52 are preferably wing-shaped.

The rotor 53 is provided on the outer side of the rim 51. The rotor 53 is disposed at a position facing the stator 47 of the duct 41. More specifically, the rotor 53 and the stator 47 face each other at a predetermined distance in the radial direction. That is, the electric motor 50 including the stator 47 and the rotor 53 is a radial gap type motor. In the rotor 53, a portion with high magnetic permeability and a portion with low magnetic permeability are alternately disposed circumferentially. That is, in the rotor 53, a reluctance torque is generated by a magnetic force generated from the stator 47. Accordingly, the rotor 53 (rim 51) is rotated.

The steering shaft 43 turnably supports the duct 41. More specifically, the steering shaft 43 is supported rotatably by the turning mechanism 46 via a tapered roller bearing 55. The steering shaft 43 supports, via the tapered roller bearing 55, the casing 44 which is integral with the duct 41. The motor controller 45 is housed in the casing 44. The steering shaft 43 preferably has a hollow shape. Inside the hollow shape of the steering shaft 43, wiring that supplies electric power to the stator 47, wiring to connect the motor controller 45 and a battery (not shown) equipped in the hull 2, wiring to connect an inboard LAN (Local Area Network) 91 (refer to FIG. 6) and the motor controller 45, and wiring to connect the motor controller 45 and the turning mechanism 46, etc., are housed.

In the present preferred embodiment, the casing 44 is fixed to the duct 41 and turns together with the duct 41. More specifically, the casing 44 is integral with the duct 41. The casing 44 preferably has a streamlined shape along the rotation axis A of the propeller 42. More specifically, the casing 44 preferably has a streamlined shape so that its resistance to water relatively flowing in the direction X along the rotation axis A is small. In greater detail, the duct 41 and the casing 44 are preferably wing-shaped in cross section. Therefore, the duct 41 and the casing 44 generate a propulsive force by a wing effect when a water flow in a direction X2 from the front edge to the rear edge of the duct 41 is generated. On the other hand, the duct 41 and the casing 44, when a water flow in a reverse direction X1 is generated, hardly generate a propulsive force attributable to this water flow. This causes a difference between a propulsive force (forward-traveling propulsive force) in the direction X1 generated by rotating the propeller 42 forward and a propulsive force (backward-traveling propulsive force) in the direction X2 generated by reversely rotating the propeller 42 even though the rotation speed is the same. That is, the propulsive force (forward-traveling propulsive force) in the direction X1 is greater.

The turning mechanism 46 is disposed above the duct 41, and turns the duct 41. The turning mechanism 46 includes an electric motor 60, a reducer 61, and a turning angle sensor 62. The electric motor 60 of the turning mechanism 46 is driven based on a command from a controller 90 (refer to FIG. 6). The electric motor 60 is driven to rotate when supplied with electric power from a battery (not shown) equipped in the hull 2 via a driver. The electric motor 60 rotates the steering shaft 43 around a turning axis B via the reducer 61. The turning angle sensor 62 detects a rotational movement angle of the steering shaft 43 as a turning angle. Based on a detected turning angle, the electric motor 60 is feedback-controlled.

Figure 5:
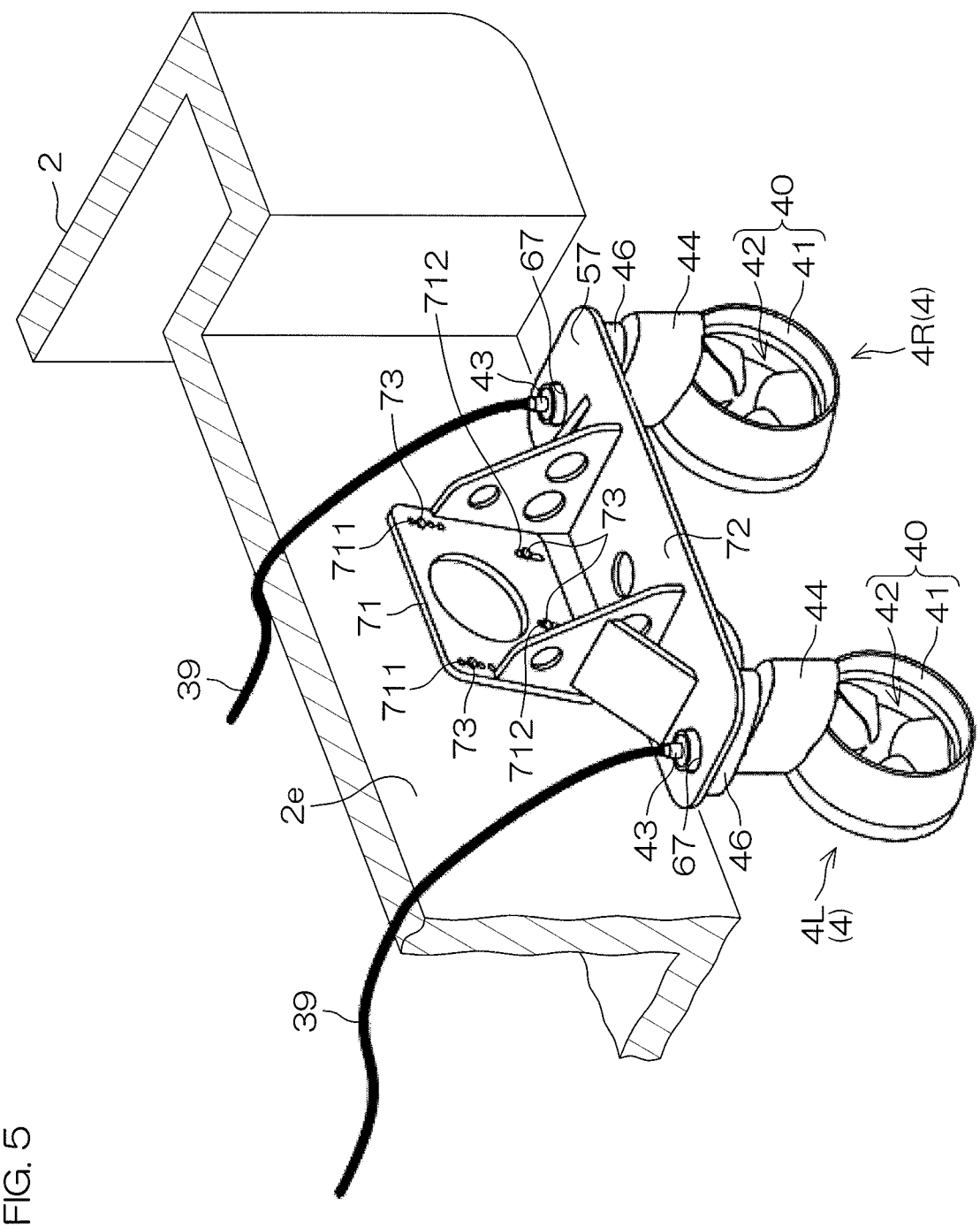
FIG. 5 is a perspective view showing structure that attaches the electric propulsion unit to a hull.

FIG. 5 is a perspective view showing an example of the structure that attaches the electric propulsion unit 4 to the hull 2. A starboard electric propulsion unit 4R and a portside electric propulsion unit 4L are attached to the hull 2 via a common bracket 57. The bracket 57 supports the electric propulsion units 4R and 4L and is attached to the rear side of the hull 2. The bracket 57 includes a hull attachment 71 and a propulsion unit attachment 72. The hull attachment 71 preferably has a tabular shape. The hull attachment 71 is attached to a transom at the rear side of the hull 2. The propulsion unit attachment 72 defines a predetermined angle with the hull attachment 71 and is integral with the hull attachment 71. The propulsion unit attachment 72 preferably has a tabular shape along a substantially horizontal direction. The electric propulsion units 4R and 4L are attached to the propulsion unit attachment 72. More specifically, an upper surface of the turning mechanism 46 is fixed to the propulsion unit attachment 72 of the bracket 57.

Near right and left end portions of the propulsion unit attachment 72, a pair of attaching holes 67 through which steering shafts 43 of the electric propulsion units 4R and 4L are inserted are respectively provided. In a state where the portion of the steering shaft 43 is inserted through the attaching hole 67, the turning mechanism 46 is fixed to a lower surface of the propulsion unit attachment 72 by bolts 68, for example (refer to FIG. 4).

Near right and left edge portions of the hull attachment 71, rows each including a plurality of holes 711 are respectively provided, and on the lower sides of these, a pair of slots 712 extending vertically are respectively provided. Bolts 73 are respectively inserted through the holes 711 and the slots 712, and these bolts 73 are coupled to a transom plate 2e of the hull 2. Accordingly, the bracket 57 is fixed to the hull 2. Into the steering shaft 43, wirings 39 are inserted. The wirings 39 are led to the hull 2 and connected to the battery (not shown) and the controller 90 (refer to FIG. 6), etc., disposed inside the hull 2.

Figure 6:
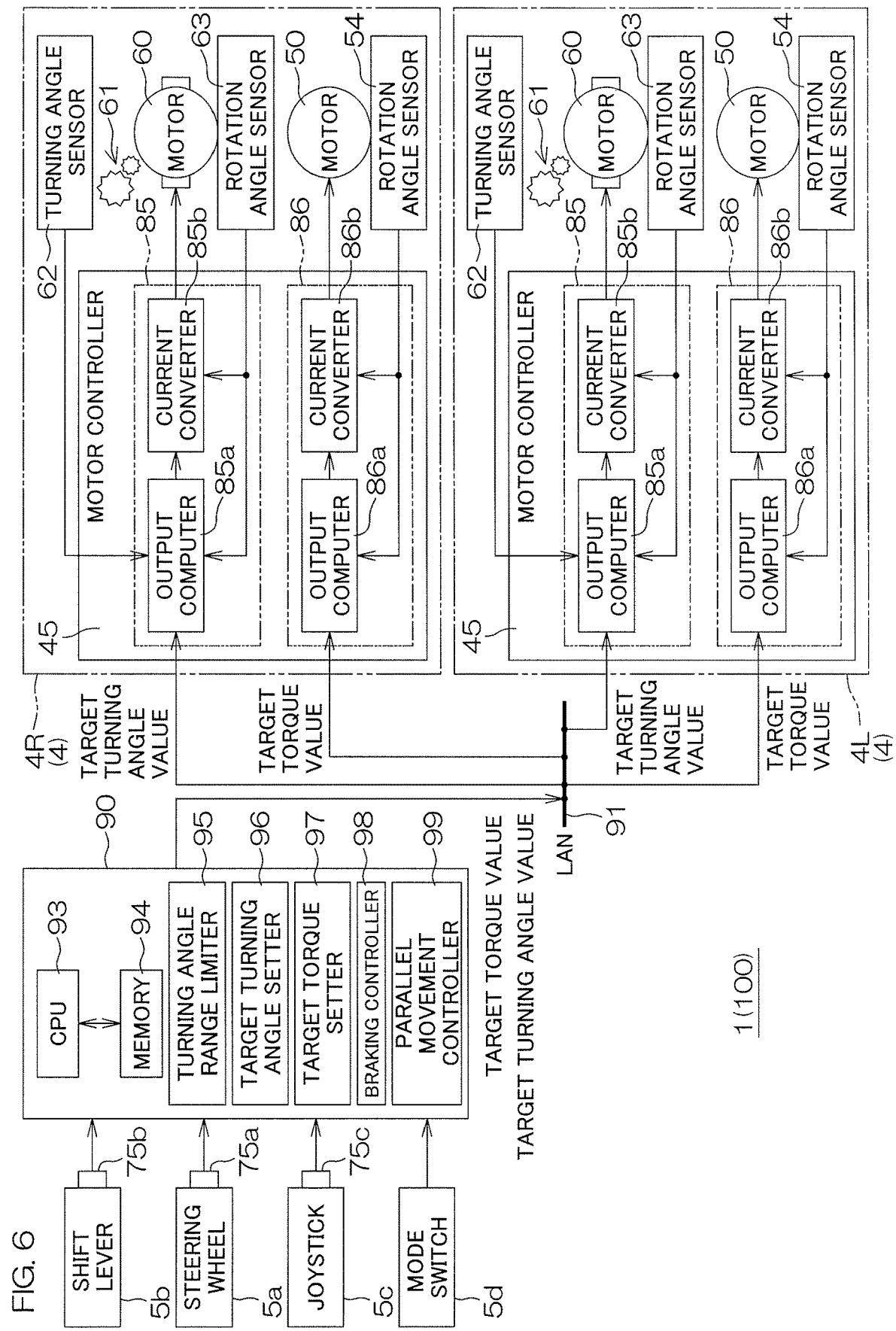
FIG. 6 is a block diagram of an electrical configuration of the vessel.

FIG. 6 is a block diagram describing an electrical configuration of the vessel. The vessel 1 includes the controller 90. The controller 90 and the electric propulsion unit 4 define a vessel propulsion apparatus 100 according to a preferred embodiment of the present invention. Input signals from the steering wheel 5a, the shift lever 5b, the joystick 5c, and the mode switch 5d are input into the controller 90. More specifically, in relation to the steering wheel 5a, an operation angle sensor 75a that detects an operation angle of the steering wheel 5a is provided. In addition, in relation to the shift lever 5b, an accelerator opening degree sensor 75b including a position sensor that detects an operation position (operation amount) of the shift lever 5b is provided. Further, in relation to the joystick 5c, a joystick position sensor 75c including a position sensor that detects an operation position of the joystick 5c is provided. Detection signals of these sensors 75a, 75b, and 75c and an output signal of the mode switch 5d are input into the controller 90.

The controller 90 is connected to the inboard LAN 91. The turning mechanism 46 of each of the electric propulsion units 4R and 4L includes, as described above, an electric motor (hereinafter, referred to as a "turning motor 60") as a drive source. The electric motor 50 (hereinafter, referred to as a "propulsion motor 50") that rotationally drives the propeller 42, and the turning motor 60 are actuated by a drive current supplied from the motor controller 45. The motor controller 45 of each of the electric propulsion units 4R and 4L is connected to the inboard LAN 91. The controller 90 communicates with each motor controller 45 via the inboard LAN 91, and provides a drive command value to each motor controller 45.

The motor controller 45 includes a turning motor controller 85 to drive the turning motor 60 and a propulsion motor controller 86 to drive the propulsion motor 50.

The turning motor controller 85 includes an output computer 85a and a current converter 85b. Into the output computer 85a, a target turning angle value, an actual turning angle value, and a motor rotation angle are input. The target turning angle value is output from the controller 90 via the inboard LAN 91. The actual turning angle value is detected by the turning angle sensor 62 equipped in the turning mechanism 30. The motor rotation angle is detected by a rotation angle sensor 63 attached to the turning motor 60. The rotation angle sensor 63 detects a rotation angle of a rotor of the turning motor 60. The output computer 85a generates an output torque value based on a deviation between the target turning angle value and the actual turning angle value, and a motor rotation angle detected by the rotation angle sensor 63, and supplies the output torque value to the current converter 85b. The current converter 85b supplies a drive current corresponding to the output torque value to the turning motor 60. Thus, the turning motor 60 is driven. The turning motor 60 is accordingly feedback-controlled so that the actual turning angle approaches the target turning angle value.

The propulsion motor controller 86 is an example of a motor controller, and includes an output computer 86a and a current converter 86b. Into the output computer 86a, a target torque value is input, and a motor rotation angle is input. The target torque value is output from the controller 90 via the inboard LAN 91. The motor rotation angle is detected by the rotation angle sensor 54 attached to the propulsion motor 50. The rotation angle sensor 54 detects a rotation angle of a rotor 53 of the propulsion motor 50. Instead of a rotation angle sensor 54, it is also possible that a rotation angle of the propulsion motor 50 is obtained by internal computing by the motor controller 45. The output computer 86a generates an output torque value based on the target torque value and the motor rotation angle, and supplies the output torque value to the current converter 86b. The current converter 86b supplies a drive current corresponding to the output torque value to the propulsion motor 50, and thus, the propulsion motor 50 is driven. Accordingly, the propulsion motor 50 is controlled so that the target torque value is reached, and accordingly, a propulsive force satisfying a requested output is obtained. The target torque value is a positive or negative value. When the target torque value is a positive value, the propulsion motor 50 is driven in a forward rotation direction. When the target torque value is a negative value, the propulsion motor 50 is driven in a reverse rotation direction. That is, the propulsion motor controller 86 drives the propulsion motor 50 in the forward rotation direction and the reverse rotation direction.

The motor controller 45 transmits output torque values operated by the output computers 85a and 86a and an actual turning angle value to the controller 90 via the inboard LAN 91.

Into the controller 90, shift lever position information (an output of the accelerator opening degree sensor 75b) showing an operation position of the shift lever 5b is input. The shift lever 5b is an operating element to be operated by an operator to select forward traveling, stop, or backward traveling (shift position), and set an accelerator opening degree (accelerator operation amount). An operation amount of the shift lever 5b is detected by the accelerator opening degree sensor 75b. Therefore, the controller 90 interprets output signals of the accelerator opening degree sensor 75b as shift lever position information and accelerator opening degree information. Into the controller 90, operation angle information of the steering wheel 5a (an output of the operation angle sensor 75a) is input. Operation position information of the joystick 5c (an output of the joystick position sensor 75c) is also input into the controller 90. The joystick 5c is an example of an accelerator (accelerator operator, accelerator lever). An operation position of the joystick 5c is detected by the joystick position sensor 75c. The controller 90 interprets output signals of the joystick position sensor 75c as a steering command signal and an accelerator command signal (accelerator opening degree), etc. Further, into the controller 90, mode command information is input from the mode switch 5d. The mode switch 5d is a switch to be operated by an operator. By operating the mode switch 5d, an operator is able to select a reverse propulsion mode, and cancel the reverse propulsion mode. In the reverse propulsion mode, the duct 41 of the electric propulsion unit 4 is directed toward the rear side. For example, when it is desired to apply a large braking force to the vessel 1 traveling forward, by using the reverse propulsion mode, the vessel 1 is able to be quickly decelerated or stopped.

Into the controller 90, various pieces of information are further input from the inboard LAN 91. More specifically, as information relating to the electric propulsion units 4R and 4L, output torque values and actual turning angle values, etc., are input into the controller 90.

The controller 90 outputs, as described above, target turning angle values, target torque values, and target storing angle values in relation to the electric propulsion units 4R and 4L.

In a preferred embodiment, the controller 90 is programmed to limit, under normal conditions, the turning angle range of the electric propulsion unit 4 to a reduced turning angle range (for example, a range of about ±150 degrees), and cancel this limitation and allow turning over a wider turning angle range when a predetermined limitation cancellation condition is met. The controller 90 includes a CPU (Central Processing Unit) 93, and a memory 94 storing programs to be executed by the CPU 93. When the CPU 93 executes the programs, the controller 90 performs functions as a plurality of functional processors. One of the functions is a turning angle range limiter 95 that limits the turning angle range of the electric propulsion unit 4 and cancels the limitation.

Further, the controller 90 performs functions as a target turning angle setter 96, a target torque setter 97, a braking controller 98, and a lateral movement controller 99. The target turning angle setter 96 sets target turning angle values of the electric propulsion units 4R and 4L. The target torque setter 97 sets target torque values for the propulsion motors 50 of the respective electric propulsion units 4R and 4L. For example, in order to rotate the propulsion motor 50 in the forward rotation direction, a target torque value with a positive sign is set, and to rotate the propulsion motor 50 in a reverse rotation direction, a target torque value with a negative sign is set. Therefore, the target torque setter 97 performs a function as a rotation direction controller to set a rotation direction of the propulsion motor 59 by setting a sign of the target torque value. The braking controller 98 performs brake control (in particular, sudden braking) for the vessel 1. The lateral movement controller 99 performs a control relating to lateral movement to move the hull 2 while preventing the hull 2 from turning.

Figure 7:
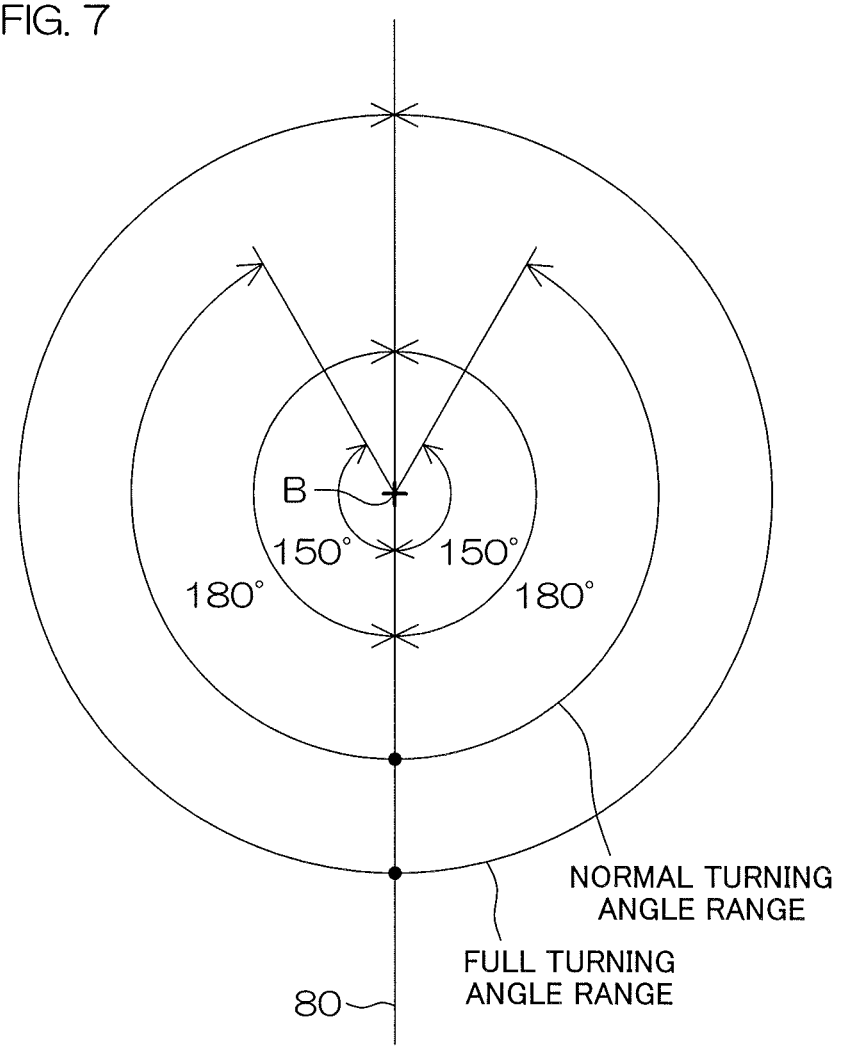
FIG. 7 is a view showing limitations of a turning angle range of the electric propulsion unit.

FIG. 7 describes a limitation on the turning angle range of the electric propulsion unit. The turning angle may be based on, for example, a reference line 80 parallel to the hull center line 7 (refer to FIG. 1) and passing through the turning axis B (that is, turning angle=0). The full turning angle range of the electric propulsion unit 4 is a range including about 180 degrees on each of the right and left of the reference line 80, that is, including a range of about ±180 degrees. Therefore, the turning mechanism 46 is able to direct the duct 41 toward any direction around the steering shaft 43. However, the full turning angle range is not unlimited but limited mainly by wiring connections relating to the motor controller 45 and the turning mechanism 46. More specifically, the full turning angle range may cover approximately ±200 degrees, for example.

Under normal conditions, the controller 90 limits the turning angle range to a reduced turning angle range narrower than the full turning angle range, more specifically, narrower than about ±180 degrees. That is, the controller 90 generates a target turning angle value within the reduced turning angle range and provides it to the motor controller 45 of the electric propulsion unit 4. The reduced turning angle range may be, for example, a range of about ±150 degrees.

On the other hand, the controller 90 cancels the above-described limitation and allows turning in a turning angle range (for example, the full turning angle range) wider than the reduced turning angle range when a predetermined limitation cancellation condition is met. The controller 90 thus includes a function as a turning angle range limiter 95 to limit the turning angle range to the reduced turning angle range and cancel the limitation.

A detailed example of the limitation cancellation condition is a start of the reverse propulsion mode in a preferred embodiment of the present invention. The reverse propulsion mode is a mode to direct the duct 41 of the electric propulsion unit 4 toward the rear side. In other words, the reverse propulsion mode is a mode in which the controller 90 reverses the target turning angle value by 180 degrees with respect to that in normal conditions. The reverse propulsion mode is started individually in the right and left electric propulsion units 4R and 4L, and canceled (ended) individually.

A condition to start the reverse propulsion mode may be met by, for example, at least one of the following conditions A1, A2, and A3.

Condition A1: The reverse propulsion mode has been selected by the mode switch 5d.

Condition A2: An operation amount of the shift lever 5b or the joystick 5c in a specific direction is large, and this large operation amount has been maintained for a predetermined duration.

Condition A3: The shift lever 5b or the joystick 5c has been largely operated a plurality of times successively (at short time intervals) in a specific direction.

Whether Conditions A1 to A3 have been met or not is judged individually for the right and left electric propulsion units 4R and 4L.

When Condition A1 is met, the reverse propulsion mode is started for both of the right and left electric propulsion units 4R and 4L.

Concerning Condition A2, there is a case in which the reverse propulsion mode is started for both of the right and left electric propulsion unit 4R and 4L, and a case in which the reverse propulsion mode is started only for one of the electric propulsion units 4, and for the other electric propulsion unit 4, the reverse propulsion mode is not started but turning angle control in a normal mode is performed. When the shift lever 5b is operated in the backward-traveling direction, and the operation amount thereof is large, the reverse propulsion mode is started in both of the electric propulsion units 4. When the joystick 5c is operated in a direction including a backward-traveling direction component, and the backward-traveling direction component is large, the reverse propulsion mode is started for both of the electric propulsion units 4. When the joystick 5c is operated in a direction including a rightward component and the rightward component is large, the reverse propulsion mode is started for the starboard electric propulsion unit 4R, and the normal mode is set for the portside electric propulsion unit 4L. When the joystick 5c is operated in a direction including a leftward component and the leftward component is large, the reverse propulsion mode is started for the portside electric propulsion unit 4L, and the normal mode is set for the starboard electric propulsion unit 4R.

Concerning Condition A3, there is a case in which the reverse propulsion mode is started for both of the right and left electric propulsion units 4R and 4L, and a case in which the reverse propulsion mode is started only for one of the electric propulsion units 4, and turning angle control in the normal mode is performed for the other electric propulsion unit 4. When the shift lever 5b is repeatedly largely operated in the backward-traveling direction, the reverse propulsion mode is started in both electric propulsion units 4. When the joystick 5c is repeatedly largely operated in a direction containing a backward-traveling direction component, the reverse propulsion mode is started for both electric propulsion units 4. When the joystick 5c is repeatedly operated in a direction containing a large rightward component, the reverse propulsion mode is started for the starboard electric propulsion unit 4R, and the normal mode is set for the portside electric propulsion unit 4L. When the joystick 5c is repeatedly operated in a direction including a large leftward component, the reverse propulsion mode is started for the portside electric propulsion unit 4L, and the normal mode is set for the starboard electric propulsion unit 4R.

A condition to end the reverse propulsion mode may be met by, for example, at least one of the following conditions B1, B2, and B3.

Condition B1: Selection of the reverse propulsion mode has been canceled by the mode switch 5d.

Condition B2: Condition A2 has not been met for a predetermined period of time.

Condition B3: Condition A3 has not been met for a predetermined period of time.

Whether Conditions B1 to B3 have been met or not is judged individually for the right and left electric propulsion units 4R and 4L. When Condition B1 is met, in both of the right and left electric propulsion units 4R and 4L, the reverse propulsion mode is ended, and the normal mode is restored. Concerning conditions B2, B3, in the electric propulsion unit 4 in the reverse propulsion mode, the reverse propulsion mode is ended, and the electric propulsion unit 4 returns to the normal mode.

Figure 8:
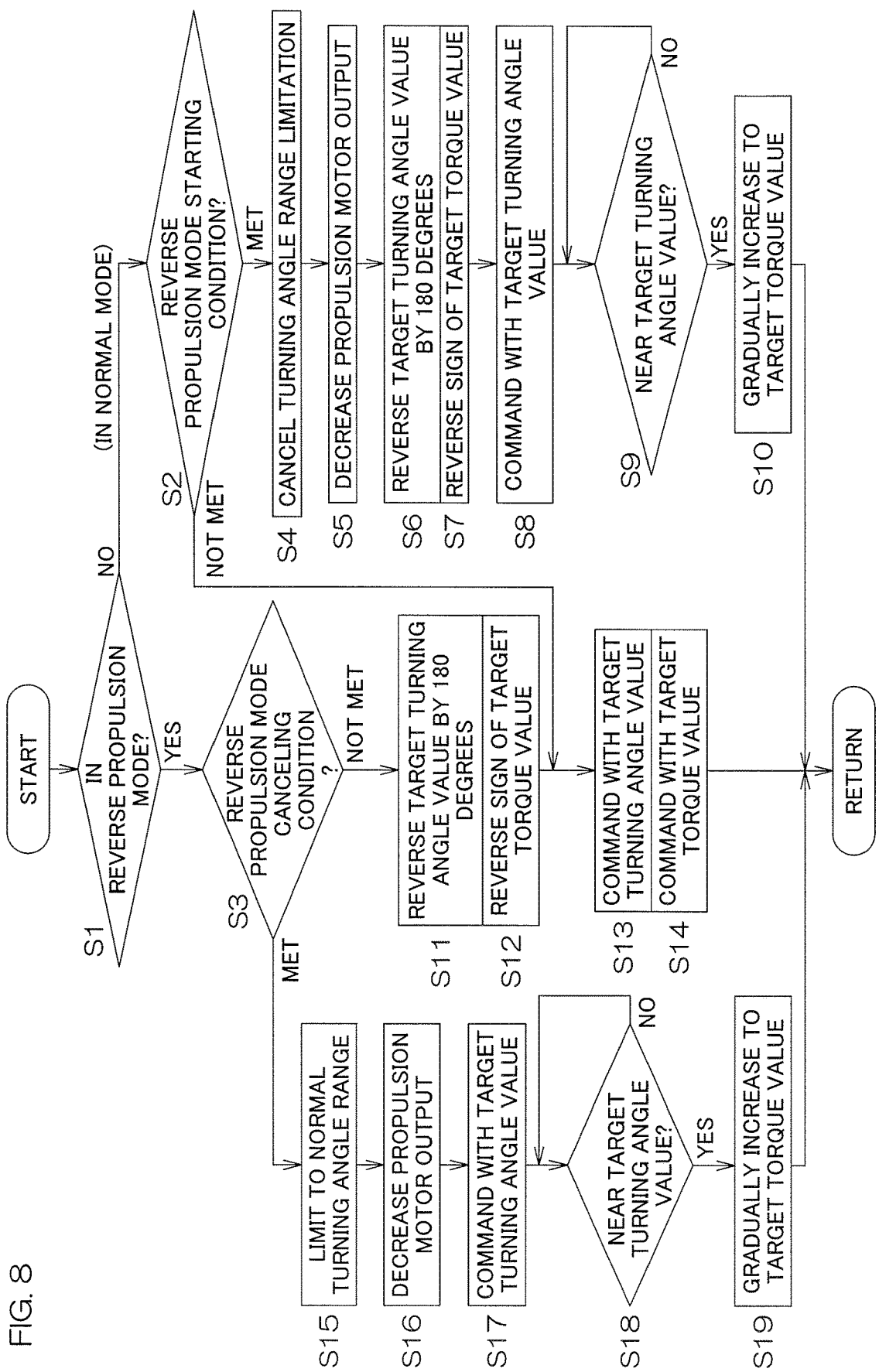
FIG. 8 is a flowchart of a process to be repeatedly performed by a controller in relation to a reverse propulsion mode.

FIG. 8 is a flowchart to describe an example of a process to be repeatedly performed by the controller 90 in relation to the reverse propulsion mode. The controller 90 performs this process individually for the right and left electric propulsion units 4R and 4L, and performs turning angle control according to the reverse propulsion mode or turning angle control according to the normal mode individually for these electric propulsion units.

The controller 90 judges whether the electric propulsion unit is in the reverse propulsion mode (Step S1), and when the electric propulsion unit is not in the reverse propulsion mode (Step S1: NO), that is, when the electric propulsion unit is in the normal mode, judges whether the reverse propulsion mode starting condition (Conditions A1 to A3) has been met or not (Step S2). When the electric propulsion unit is in the reverse propulsion mode (Step S1: YES), the controller judges whether the reverse propulsion mode canceling condition (Conditions B1 to B3) has been met or not (Step S3).

When the reverse propulsion mode starting condition is met (Step S2: met) in the normal mode (Step S1: NO), the controller 90 starts the reverse propulsion mode. More specifically, the controller 90 cancels the limitation on the turning angle range (Step S4), and allows turning in a turning angle range (for example, the full turning angle range) wider than the reduced turning angle range (for example, about ±150 degrees). This turning angle range includes a range of at least about ±180 degrees. The controller 90 decreases a torque command value for the propulsion motor 50 to decrease an output of the propulsion motor 50 (Step S5), preferably, stop it. Further, the controller 90 reverses the target turning angle value by 180 degrees (Step S6, function of the target turning angle setter 96), and reverses the sign of the target torque value with respect to that in the normal mode (Step S7, function of the target torque setter 97). Then, the controller 90 outputs a turning command with the target turning angle value reversed by 180 degrees (Step S8). After the actual turning angle value sufficiently approaches the target turning angle value (Step S9: YES), the controller 90 gradually increases the output of the propulsion motor 50 to the target torque value reversed in sign (Step S10).

When the reverse propulsion mode is being performed (Step S1: YES) and a condition to cancel this mode is not met (Step S3: not met), the controller 90 reverses the target turning angle value by 180 degrees with respect to that in the normal mode (Step S11), and reverses the sign of the target torque value with respect to that in the normal mode (Step S12). Then, the controller 90 outputs a turning command with the target turning angle value reversed by 180 degrees (Step S13), and outputs a torque generation command with the target torque value reversed in sign (Step S14).

Thus, in the reverse propulsion mode, the sign of the target torque value is reversed, so that when the shift lever 5b or the joystick 5c is tilted in the backward-traveling direction, the propulsion motor 50 is driven in the forward rotation direction. Then, the target turning angle value is reversed by 180 degrees, so that the duct 41 of the electric propulsion unit 4 is directed toward the rear side. Accordingly, when the shift lever 5b or the joystick 5c is tilted in the backward-traveling direction, the electric propulsion unit 4 provides a propulsive force in the backward-traveling direction to the hull 2. The magnitude of this propulsive force is equal to that of a propulsive force in the forward-traveling direction in the normal mode, so that a large propulsive force is provided to the hull 2.

When a condition to cancel this mode is met (Step S3: met) while the reverse propulsion mode is performed (Step S1: YES), the controller 90 starts the normal mode. More specifically, the controller 90 limits the turning angle range to the reduced turning angle range (for example, about ±150 degrees) (Step S15). Therefore, the target turning angle is set to a value within the reduced turning angle range. The controller 90 decreases the torque command value for the propulsion motor 50 to decrease the output of the propulsion motor 50 (Step S16), preferably, stop it. Further, the controller 90 outputs a turning command with a target turning angle value corresponding to an operation angle of the steering wheel 5a or an operation position of the joystick 5c (Step S17). After the actual turning angle value sufficiently approaches the target turning angle value (Step S18: YES), the controller 90 gradually increases the output of the propulsion motor 50 to a target torque value corresponding to an operation position of the shift lever 5b or the joystick 5c (Step S19).

When the reverse propulsion mode starting condition is not met (Step S2: not met) while the normal mode is performed (Step S1: NO), the controller 90 outputs a turning command with a target turning angle value corresponding to an operation angle of the steering wheel 5a or an operation position of the joystick 5c (Step S13), and outputs a torque generation command with a target torque value corresponding to an operation position of the shift lever 5b or the joystick 5c (Step S14). At this time, the turning angle range is limited to the reduced turning angle range (for example, about ±150 degrees), so that a target turning angle is set within this reduced turning angle range.

FIG. 9 shows an example of a situation in which the reverse propulsion mode is set for both of the right and left electric propulsion units 4R and 4L. A case of suddenly decelerating the vessel 1 during straight traveling is assumed. A vessel operator selects the reverse propulsion mode by operating the mode switch 5d, or largely operates the shift lever 5b or the joystick 5c in the backward-traveling direction and repeats or keeps this operation state. Accordingly, one of Conditions A1-A3 is met and the reverse propulsion mode is started. Then, by the controller 90 performing the function of the braking controller 98, the following operation is realized.

A vessel operator keeps largely operating the shift lever 5b or the joystick 5c in the backward-traveling direction to suddenly decelerate the vessel 1, for example. In the reverse propulsion mode, target turning angles are reversed by 180 degrees, so that the ducts 41 are directed toward the rear side. In addition, the signs of the target torque values are reversed, so that the propulsion motors 50 are rotated in the forward rotation direction. This is because in the normal mode, negative target torque values are set to drive the propulsion motors 50 in the reverse rotation direction in a state where the target turning angles are set to near 0 degrees. By rotating the propulsion motors 50 in the forward rotation direction in a state where the ducts 41 are directed toward the rear side, the propellers 42 are rotated to generate water flows from the front edges to the rear edges of the ducts 41. Accordingly, propulsive forces fR and fL greater than when the ducts 41 are directed toward the front side of the vessel 1 and the propulsion motors 50 are rotated in the reverse rotation direction are generated. The propulsive forces fR and fL propel the vessel 2 backward, so that a large braking force FB is generated, and the vessel 1 is able to be quickly decelerated or stopped.

FIGS. 10A and 10B show examples in a case in which the hull is moved laterally without turning, in particular, a case in which the hull is moved laterally to the right or left. The controller 90 may interpret a command from the joystick 5c as a lateral movement command to move the hull 2 laterally. In this case, the controller 90 performs a function as a lateral movement controller 99.

The controller 90 sets, in response to an input of a lateral movement command from the joystick 5c, target turning angles of the electric propulsion units 4R and 4L so that the propulsive force action 9R and 9L along directions of propulsive forces generated by the two electric propulsion units 4R and 4L respectively pass through the center of gravity 8 of the hull 2 in a planar view. The controller 90 puts one of the two electric propulsion units 4R and 4L into the reverse propulsion mode, and puts the other into the normal mode. In the electric propulsion unit 4 for which the reverse propulsion mode has been set, the duct 41 is turned beyond the reduced turning angle range and directed toward the rear side of the hull 2. For the electric propulsion unit 4 for which the reverse propulsion mode has been set, a target torque value is set so that the propulsion motor 50 rotates in the reverse rotation direction.

In greater detail, a case in which the joystick 5c is tilted rightward and lateral movement toward the right side is commanded (an example of a lateral movement command) is assumed. In this case, as shown in FIG. 10A, the controller 90 sets the portside electric propulsion unit 4L into the normal mode and directs the duct 41 toward the front side and drives the propulsion motor 50 in the forward rotation direction to apply a propulsive force in the forward-traveling direction to the hull 2. On the other hand, the controller 90 sets the starboard electric propulsion unit 4R into the reverse propulsion mode and directs the duct 41 toward the rear side and drives the propulsion motor 50 in the forward rotation direction to apply a propulsive force in the backward-traveling direction to the hull 2. Both turning angles of the right and left electric propulsion units 4R and 4L are set so that the propulsive force action lines 9L and 9R pass through the center of gravity 8 of the hull 2. In propulsive forces fR and fL generated by the right and left electric propulsion units 4R and 4L, components along the front-rear direction of the hull 2 cancel each other, so that a resultant force FR is directed toward the right side of the hull 2. Therefore, the hull 2 moves laterally rightward. Both of the propulsion motors 50 of the right and left electric propulsion units 4R and 4L are driven in the forward rotation direction, so that they are able to generate large propulsive forces. Accordingly, the hull 2 is smoothly moved laterally rightward.

The same applies in the case in which the joystick 5c is tilted leftward and lateral movement toward the left side is commanded (an example of a lateral movement command). In this case, as shown in FIG. 10B, the controller 90 sets the starboard electric propulsion unit 4R into the normal mode and directs the duct 41 toward the front side, and drives the propulsion motor 50 in the forward rotation direction to apply a propulsive force in the forward-traveling direction to the hull 2. On the other hand, the controller 90 sets the portside electric propulsion unit 4L into the reverse propulsion mode and directs the duct 41 toward the rear side, and drives the propulsion motor 50 in the forward rotation direction to apply a propulsive force in the backward-traveling direction to the hull 2. Both turning angles of the right and left electric propulsion units 4R and 4L are set so that the propulsive force action lines 9R and 9L pass through the center of gravity 8 of the hull 2. In propulsive forces fR and fL generated by the right and left electric propulsion units 4R and 4L, components along the front-rear direction of the hull 2 cancel each other, so that a resultant force FL is directed toward the left side of the hull 2. Therefore, the hull 2 moves laterally leftward. Both of the propulsion motors 50 of the right and left electric propulsion units 4R and 4L are driven in the forward rotation direction, so that they are able to generate large propulsive forces. Accordingly, the hull 2 is smoothly moved laterally leftward.

Thus, according to a preferred embodiment of the present invention, the propulsive force generator 40 includes the duct 41 and the propeller 42. The stator 47 equipped on the duct 41 and the rotor 53 equipped on the rim 51 of the propeller 42 define an electric motor (propulsion motor) 50. When the propulsion motor 50 is driven in the forward rotation direction, the propeller 42 generates a forward-traveling propulsive force, and when the propulsion motor 50 is driven in the reverse rotation direction, the propeller 42 generates a backward-traveling propulsive force. However, when the propeller 42 generates a forward-traveling propulsive force in a state in which the duct 41 is directed toward the rear side, this forward-traveling propulsive force is applied as a propulsive force in the backward-traveling direction to the hull 2.

The propulsive force generator 40 is turned in the reduced turning angle range (for example, about ±150 degrees) under normal conditions. Accordingly, as compared with the case in which the turning angle range is unlimited, turning responsiveness becomes higher, and stress on the wirings 39 is decreased.

On the other hand, when a reverse propulsion mode starting condition as an example of a limitation cancellation condition is met, turning in a turning angle range (for example, the full turning angle range including a range of about ±180 degrees) wider than the reduced turning angle range is allowed. Accordingly, the propulsive force generator 40 is more freely turned. For example, it is possible to turn such that the duct 41 is directed directly behind the hull 2. Accordingly, a forward-traveling propulsive force generated by the propulsive force generator 40 acts rearward, and a large propulsive force in the backward-traveling direction is provided to the hull 2. Thus, a maximum propulsive force generated by the propulsive force generator 40 is used, so that traveling performance of the vessel 1 is improved.

Particularly, in a preferred embodiment of the present invention, the propulsive force generator 40 is designed so that a forward-traveling propulsive force generated when the propulsion motor 50 is rotated in the forward rotation direction is greater than a backward-traveling propulsive force generated when the propulsion motor 50 is rotated in the backward rotation direction at the same speed. Therefore, a greater backward-traveling propulsive force is provided to the hull 2 when the duct 41 is directed toward the rear side of the hull 2 and the propulsion motor 50 is rotated forward than when the duct 41 is directed toward the front side of the hull 2 and the propulsion motor 50 is reversely rotated. Accordingly, a propulsive force in the backward-traveling direction is provided to the hull 2 by utilizing a maximum propulsive force generated by the propulsive force generator 40.

In a preferred embodiment of the present invention, when a reverse propulsion mode starting condition is met, the target turning angle is reversed by 180 degrees, and the direction of the duct 41 is reversed by 180 degrees. Further, the sign of the target torque value of the propulsion motor 50 is reversed, and accordingly, the rotation direction of the propulsion motor 50 is reversed. Therefore, when the reverse propulsion mode starting condition is met while the propulsion motor 50 rotates in the reverse rotation direction in a state in which the duct 41 is directed toward the front side of the vessel 1, the duct 41 is directed toward the rear side, and the propulsion motor 50 is driven in the forward rotation direction. Accordingly, a propulsive force in the backward-traveling direction is applied to the hull 2 by using a maximum propulsive force generated by the propulsive force generator 40.

More specifically, in a preferred embodiment of the present invention, when a braking command is input in response to a large rearward operation of the shift lever 5b or the joystick 5c by a vessel operator to brake the vessel 1, a reverse propulsion mode starting condition is met. Accordingly, the duct 41 is directed toward the rear side, and the propulsion motor 50 is driven in the forward rotation direction, and thus, a large backward-traveling propulsive force is provided to the hull 2. As a result, the hull 2 is braked by using a maximum propulsive force generated by the propulsive force generator 40. Accordingly, the braking distance is reduced, so that the traveling performance of the vessel 1 is improved.

In a preferred embodiment of the present invention, when a lateral movement command to move the vessel 1 while preventing the vessel 1 from turning is input in response to an operation of the joystick 5c by a vessel operator, a reverse propulsion mode starting condition is met. Accordingly, the propulsive force action lines 9R and 9L along directions of propulsive forces of the pair of electric propulsion units 4 respectively pass through the center of gravity 8 of the hull 2 in a planar view, the duct 41 of one electric propulsion unit 4 is directed toward the front side, and the duct 41 of the other electric propulsion unit 4 is directed toward the rear side. Then, both of the propulsion motors 50 of the pair of electric propulsion units 4 are driven in the forward rotation direction, so that large propulsive forces are able to be generated. Accordingly, the vessel 1 is moved laterally by using maximum propulsive forces generated by the electric propulsion units 4, and the traveling performance of the vessel 1 is improved.

Preferred embodiments of the present invention have been described above, but the present invention may also be carried out by other preferred embodiments. For example, in a preferred embodiment described above, an example of a vessel 1 including two electric propulsion units 4 is described. However, the present invention can also be applied to a vessel including one or three or more electric propulsion units. However, in order to realize features relating to lateral movement of the vessel, the vessel preferably includes at least two electric propulsion units.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A vessel propulsion apparatus comprising:
a propulsive force generator that includes a duct and a propeller, the duct including a stator, the propeller including a rim that includes a rotor disposed at a position facing the stator, and a blade on an inner side of the rim in a radial direction of the rim;
a steering shaft that turnably supports the duct;
a motor controller that rotationally drives an electric motor including the stator and the propeller in a forward rotation direction to cause the propeller to generate a forward-traveling propulsive force and in a reverse rotation direction to cause the propeller to generate a backward-traveling propulsive force;
a turning mechanism that turns the duct in a full turning angle range including a range of ±180 degrees; and
a controller configured or programmed to define:
a turning angle range limiter that limits a turning angle range of the turning mechanism to a reduced turning angle range narrower than the full turning angle range, and, when a predetermined limitation cancellation condition is met, cancels a limitation of the turning angle range being the reduced turning angle range and allows turning in a turning angle range wider than the reduced turning angle range;
a target turning angle setter that sets a target turning angle in the reduced turning angle range; and
a rotation direction controller that sets a rotation direction of the electric motor to the motor controller; wherein
when the predetermined limitation cancellation condition is met, the target turning angle setter reverses the target turning angle, and the rotation direction controller instructs the motor controller to reverse the rotation direction of the electric motor.

2. The vessel propulsion apparatus according to claim 1, wherein the propulsive force generator generates a forward-traveling propulsive force when the electric motor is rotated forward that is greater than a backward-traveling propulsive force generated when the electric motor is reversely rotated at a same speed as when the electric motor is rotated forward.

3. The vessel propulsion apparatus according to claim 1, wherein
when the predetermined limitation cancellation condition is met, the target turning angle setter reverses the target turning angle by 180 degrees.

4. A vessel propulsion apparatus comprising:
a propulsive force generator that includes a duct and a propeller, the duct including a stator, the propeller including a rim that includes a rotor disposed at a position facing the stator, and a blade on an inner side of the rim in a radial direction of the rim;
a steering shaft that turnably supports the duct;
a motor controller that rotationally drives an electric motor including the stator and the propeller in a forward rotation direction to cause the propeller to generate a forward-traveling propulsive force and in a reverse rotation direction to cause the propeller to generate a backward-traveling propulsive force;
a turning mechanism that turns the duct in a full turning angle range including a range of ±180 degrees; and
a controller configured or programmed to define:
a turning angle range limiter that limits a turning angle range of the turning mechanism to a reduced turning angle range narrower than the full turning angle range, and, when a predetermined limitation cancellation condition is met, cancels a limitation of the turning angle range being the reduced turning angle range and allows turning in a turning angle range wider than the reduced turning angle range; and
a braking controller; wherein
the predetermined limitation cancellation condition includes an input of a braking command to brake the vessel; and
the braking controller controls the turning mechanism to direct the propulsive force generator toward a rear side of a vessel by turning the duct beyond the reduced turning angle range, and controls the motor controller to drive the electric motor in the forward rotation direction when the braking command is input.

5. A vessel propulsion apparatus comprising:
a propulsive force generator that includes a duct and a propeller, the duct including a stator, the propeller including a rim that includes a rotor disposed at a position facing the stator, and a blade on an inner side of the rim in a radial direction of the rim;
a steering shaft that turnably supports the duct;
a motor controller that rotationally drives an electric motor including the stator and the propeller in a forward rotation direction to cause the propeller to generate a forward-traveling propulsive force and in a reverse rotation direction to cause the propeller to generate a backward-traveling propulsive force;
a turning mechanism that turns the duct in a full turning angle range including a range of ±180 degrees; and
a controller configured or programmed to define:
a turning angle range limiter that limits a turning angle range of the turning mechanism to a reduced turning angle range narrower than the full turning angle range, and, when a predetermined limitation cancellation condition is met, cancels a limitation of the turning angle range being the reduced turning angle range and allows turning in a turning angle range wider than the reduced turning angle range; wherein
the predetermined limitation cancellation condition includes an input of a lateral movement command to move a vessel while preventing the vessel from turning.

6. The vessel propulsion apparatus according to claim 5, further comprising:
a couple of the propulsive force generators;
a couple of the steering shafts respectively corresponding to the couple of propulsive force generators;

a couple of the turning mechanisms respectively corresponding to the couple of propulsive force generators; and
a lateral movement controller that controls the motor controller and the couple of turning mechanisms in response to the lateral movement command so as to cause the couple of propulsive force generators to generate a propulsive force to move the vessel laterally; wherein
the lateral movement controller is configured or programmed to, in response to an input of the lateral movement command:
control the couple of turning mechanisms so that propulsive force action lines including directions of propulsive forces of the couple of propulsive force generators respectively pass through the center of gravity of the vessel in a planar view, and that one of the couple of propulsive force generators is turned beyond the reduced turning angle range and directed toward the rear side of the vessel; and
control the motor controller to rotationally drive the electric motor of the propulsive force generator directed toward the rear side of the vessel in the forward rotation direction.

7. A vessel comprising:
a hull and a vessel propulsion apparatus provided on the hull; wherein
the vessel propulsion apparatus includes:
a propulsive force generator that includes a duct and a propeller, the duct including a stator, the propeller including a rim that includes a rotor disposed at a position facing the stator, and a blade defined on the inner side in a radial direction of the rim;
a steering shaft that turnably supports the duct;
a motor controller that rotationally drives an electric motor including the stator and the propeller in a forward rotation direction to make the propeller generate a forward-traveling propulsive force and in a reverse rotation direction to make the propeller generate a backward-traveling propulsive force;
a turning mechanism that turns the duct in a full turning angle range including a range of ±180 degrees; and
a controller configured or programmed to define:
a turning angle range limiter that limits a turning angle range of the turning mechanism to a reduced turning angle range narrower than the full turning angle range, and, when a predetermined limitation cancellation condition is met, cancels a limitation of the turning angle range being the reduced turning angle range and allows turning in a turning angle range wider than the reduced turning angle range;
a target turning angle setter that sets a target turning angle in the reduced turning angle range; and
a rotation direction controller that sets a rotation direction of the electric motor to the motor controller; and
when the predetermined limitation cancellation condition is met, the target turning angle setter reverses the target turning angle, and the rotation direction controller instructs the motor controller to reverse the rotation direction of the electric motor.

8. The vessel according to claim 7, wherein the propulsive force generator generates a forward-traveling propulsive force generated when the electric motor is rotated forward that is greater than a backward-traveling propulsive force generated when the electric motor is reversely rotated at a same speed as when the electric motor is rotated forward.

9. The vessel according to claim 7, wherein
when the predetermined limitation cancellation condition is met, the target turning angle setter reverses the target turning angle by 180 degrees.

10. A vessel comprising:
a hull and a vessel propulsion apparatus provided on the hull; wherein
the vessel propulsion apparatus includes:
a propulsive force generator that includes a duct and a propeller, the duct including a stator, the propeller including a rim that includes a rotor disposed at a position facing the stator, and a blade defined on the inner side in a radial direction of the rim:
a steering shaft that turnably supports the duct;
a motor controller that rotationally drives an electric motor including the stator and the propeller in a forward rotation direction to make the propeller generate a forward-traveling propulsive force and in a reverse rotation direction to make the propeller generate a backward-traveling propulsive force;
a turning mechanism that turns the duct in a full turning angle range including a range of ±180 degrees; and
a controller configured or programmed to define:
a turning angle range limiter that limits a turning angle range of the turning mechanism to a reduced turning angle range narrower than the full turning angle range, and, when a predetermined limitation cancellation condition is met, cancels a limitation of the turning angle range being the reduced turning angle range and allows turning in a turning angle range wider than the reduced turning angle range; and
a braking controller;
the predetermined limitation cancellation condition includes an input of a braking command to brake the vessel; and
the braking controller controls the turning mechanism to direct the propulsive force generator toward the rear side of the vessel by turning the duct beyond the reduced turning angle range, and controls the motor controller to drive the electric motor in the forward rotation direction when the braking command is input.

11. A vessel comprising:
a hull and a vessel propulsion apparatus provided on the hull; wherein
the vessel propulsion apparatus includes:
a propulsive force generator that includes a duct and a propeller, the duct including a stator, the propeller including a rim that includes a rotor disposed at a position facing the stator, and a blade defined on the inner side in a radial direction of the rim;
a steering shaft that turnably supports the duct;
a motor controller that rotationally drives an electric motor including the stator and the propeller in a forward rotation direction to make the propeller generate a forward-traveling propulsive force and in a reverse rotation direction to make the propeller generate a backward-traveling propulsive force;
a turning mechanism that turns the duct in a full turning angle range including a range of ±180 degrees; and
a controller configured or programmed to define:
a turning angle range limiter that limits a turning angle range of the turning mechanism to a reduced turning angle range narrower than the full turning angle range, and, when a predetermined limitation cancellation condition is met, cancels a limitation of the turning angle range being the reduced turning angle range and allows turning in a turning angle range wider than the reduced turning angle range; and the predetermined limitation cancellation condition includes an input of a lateral movement command to move the vessel while restraining the vessel from turning.

12. The vessel according to claim 11, comprising:

a couple of the propulsive force generators;

a couple of the steering shafts respectively corresponding to the couple of propulsive force generators;

a couple of the turning mechanisms respectively corresponding to the couple of propulsive force generators; and a lateral movement controller configured or programmed to:

control the motor controller and the couple of turning mechanisms in response to the lateral movement command so as to cause the couple of propulsive force generators to generate a propulsive force to move the vessel laterally;

control, in response to an input of the lateral movement command, the couple of turning mechanisms so that propulsive force action lines including directions of propulsive forces of the couple of propulsive force generators respectively pass through the center of gravity of the vessel in a planar view, and that one of the couple of propulsive force generators is turned beyond the reduced turning angle range and directed toward the rear side of the vessel; and control the motor controller to rotationally drive the electric motor of the propulsive force generator directed toward the rear side of the vessel in the forward rotation direction.

* * * * *